United States Patent
Jang

(10) Patent No.: US 9,027,962 B1
(45) Date of Patent: May 12, 2015

(54) AIRBAG APPARATUS

(71) Applicant: Hyundai Mobis Co., Ltd., Seoul (KR)

(72) Inventor: Rae Ick Jang, Yongin (KR)

(73) Assignee: Hyundai Mobis Co., Ltd, Seoul (KR)

( * ) Notice: Subject to any disclaimer, the term of this patent is extended or adjusted under 35 U.S.C. 154(b) by 0 days.

(21) Appl. No.: 14/326,415

(22) Filed: Jul. 8, 2014

(30) Foreign Application Priority Data

Apr. 2, 2014 (KR) .................. 10-2014-0039612
May 8, 2014 (KR) .................. 10-2014-0054792

(51) Int. Cl.
| | |
|---|---|
| *B60R 21/16* | (2006.01) |
| *B60R 21/239* | (2006.01) |
| *B60R 21/00* | (2006.01) |

(52) U.S. Cl.
CPC ....... *B60R 21/239* (2013.01); *B60R 2021/0048* (2013.01); *B60R 2021/2395* (2013.01)

(58) Field of Classification Search
USPC .......................................... 280/743.1, 743.2
See application file for complete search history.

(56) References Cited

U.S. PATENT DOCUMENTS

| | | | |
|---|---|---|---|
| 2008/0073893 A1* | 3/2008 | Schneider ................. 280/740 |
| 2009/0033081 A1* | 2/2009 | Flischer et al. ............ 280/743.2 |
| 2009/0224519 A1* | 9/2009 | Fukawatase et al. ......... 280/736 |
| 2010/0102542 A1* | 4/2010 | Nakajima et al. .......... 280/743.2 |
| 2010/0133798 A1* | 6/2010 | Fukawatase et al. ...... 280/743.2 |
| 2010/0225095 A1* | 9/2010 | Smith et al. .................. 280/729 |
| 2011/0133437 A1* | 6/2011 | Jang et al. .................. 280/743.2 |
| 2011/0309605 A1* | 12/2011 | Kumagai ..................... 280/741 |
| 2012/0306187 A1* | 12/2012 | Mendez et al. ............ 280/743.2 |
| 2013/0147171 A1* | 6/2013 | Shin et al. .................. 280/743.2 |
| 2014/0265280 A1* | 9/2014 | Borton et al. .............. 280/743.2 |
| 2014/0300094 A1* | 10/2014 | Williams ................... 280/743.2 |

FOREIGN PATENT DOCUMENTS

KR   10-2013-0062521 A   6/2013

\* cited by examiner

*Primary Examiner* — Toan To

(57) ABSTRACT

An airbag apparatus according to an exemplary embodiment of the present invention includes: an airbag main body; at least one vent which is provided at a side of the airbag main body, and operated in an opened state; a shield which shields the vent; and a tether which is connected with the shield, in which when an occupant in a vehicle collides with the airbag main body, the tether is operated so that the shield shields the vent.

19 Claims, 8 Drawing Sheets

AIRBAG APPARATUS

CROSS-REFERENCE TO RELATED APPLICATIONS

This application claims priority to and the benefit of Korean Patent Application No. 10-2014-0039612 and No. 10-2014-0054792 filed in the Korean Intellectual Property Office on Apr. 2, 2014, and May 8, 2014 the entire contents of which are incorporated herein by reference.

TECHNICAL FIELD

The present invention relates to an airbag apparatus, and more particularly, to an airbag apparatus which maintains internal pressure in an airbag after an occupant collides with the airbag by adjusting a point of time at which a vent hole is closed.

BACKGROUND ART

In general, an airbag apparatus for a vehicle is a safety device which deploys an airbag cushion at the time of a collision accident so as to mitigate impact, and prevents an occupant from being catapulted out of a vehicle body. The airbag apparatus may be classified into a driver airbag (DAB) and a passenger airbag (PAB) which protect occupants seated in front seats at the time of a head-on collision, and a side airbag (SAB) and a curtain airbag (CAB) which protect the sides of the occupants at the time of a broadside collision.

Regarding the passenger airbag among the airbag apparatuses, the very important point is that a problem with injury to the neck of the occupant needs to be improved by maintaining internal pressure after a collision with the occupant.

Particularly, it is necessary to pass the New Car Assessment Program (NCAP) Test in order to export vehicles to the North America, and a neck injury test is a test item with the highest importance in assessment of marketability of the passenger airbag according to the NCAP, and as a result, it is essential to improve a technology of reducing injury to the neck in this technical field.

As a related technology, Korean Patent Application Laid-Open No. 10-2013-0062521 discloses 'Airbag Cushion for Reducing Injuries having Vent Control Means'.

According to the airbag cushion for reducing injuries having a vent control means, a point of time at which a vent hole is closed is adjusted using a horizontal tether.

However, the airbag cushion for reducing injuries having a vent control means has a problem in that the vent hole cannot be closed in a case in which the horizontal tether is not pressed.

SUMMARY OF THE INVENTION

The present invention has been made in an effort to provide an airbag apparatus which reduces an amount of impact applied to an occupant using a vent when an airbag is deployed, and maintains internal pressure in the airbag by shielding the vent after the occupant collides with the airbag.

An exemplary of the present invention provides an airbag apparatus including: an airbag main body; at least one vent which is provided at a side of the airbag main body, and operated in an opened state; a shield which shields the vent; and a tether which is connected with the shield, in which when an occupant in a vehicle collides with the airbag main body, the tether is operated so that the shield shields the vent.

The airbag apparatus may further include: a pocket which is provided at a side of the airbag main body; a tether releasing unit; and a first tether which connects the pocket and the tether releasing unit, in which a variation in volume of the pocket occurs when the connection of the first tether is released, such that the shield shields the vent.

The shield may further include a cover which shields the vent, and the tether which connects the cover and the pocket.

A point of time at which the cover shields the vent may be controlled based on a volume of the pocket and a length of a second tether.

The shield may include a tube which is installed at an edge of the vent, and the first tether which is installed between the tube and the pocket, and the tube may enter the inside of the airbag main body while passing through the vent as the pocket is expanded.

A point of time at which the tube enters the airbag main body may be controlled based on a volume of the pocket and a length of the first tether.

The airbag apparatus may further include a control unit which controls a connection release time when the tether releasing unit releases the connection with the tether after gas flows into the airbag main body.

The connection release time may be within 50 ms to 70 ms after a collision with the airbag main body.

The airbag apparatus may further include a hinge portion which allows the tether to be in close contact with an inner surface of the airbag main body.

The shield may shield the vent while being operated in conjunction with the tether that is pressed.

The shield may be a cover that has one side connected to the tether, and shields the vent.

The shield may be a tube which is installed at an edge of the vent, and enters the inside of the airbag main body while passing through the vent when the tether pulls the tube.

The shield may be a curtain which has one side and the other side that are sewn, and the one side of the curtain, which is connected with the tether, may shield the vent while being fractured when the tether pulls the one side of the curtain.

A point of time at which the vent is shielded may be controlled based on a length of the tether.

According to the airbag apparatus according to the exemplary embodiment of the present invention, an amount of impact applied to the occupant is reduced when using the vent of the airbag main body when deployed, and the vent is shielded after the occupant collides with the airbag main body, thereby minimizing injury to the neck of the occupant by maintaining the internal pressure in the airbag.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
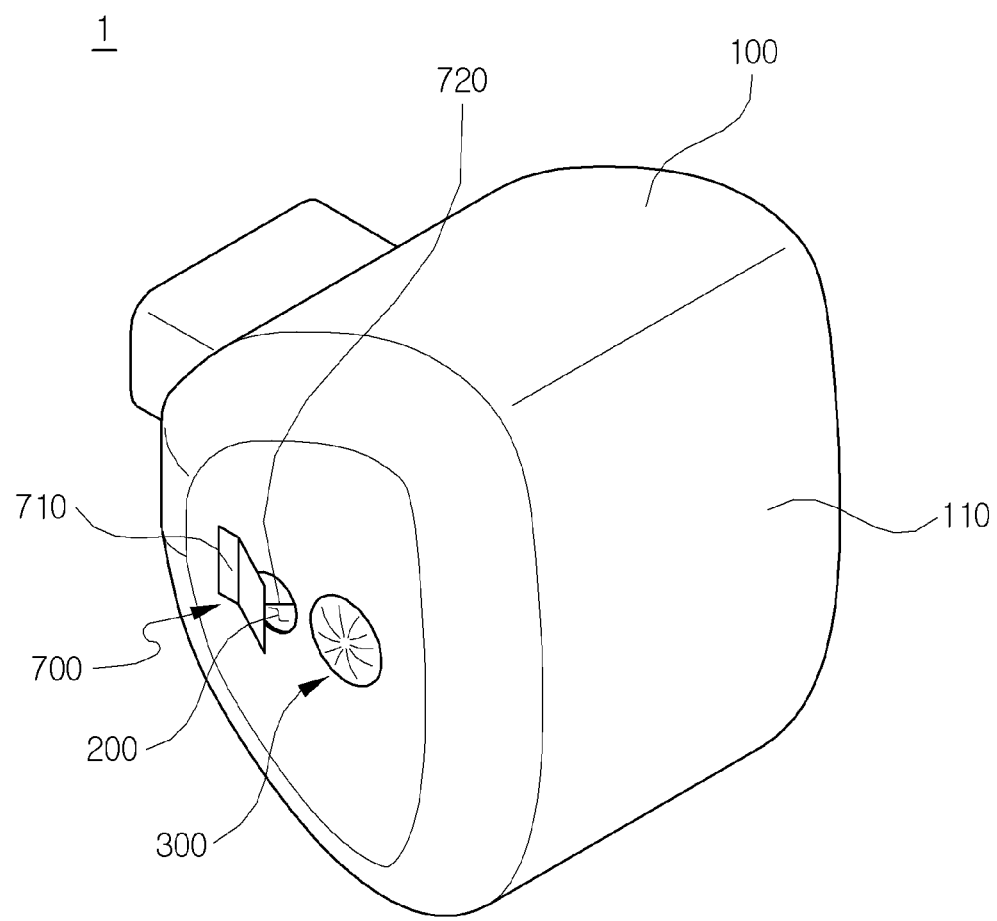
FIGS. 1 to 2 are views illustrating an airbag apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an airbag apparatus according to an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, the technical spirit of the present invention is not restricted or limited thereto, but the exemplary embodiment of the present invention may be modified by a person with ordinary skill in the art to be variously performed.

An airbag apparatus 1 according to an exemplary embodiment of the present invention includes an airbag main body 100, at least one vent 200 which is provided at a side of the airbag main body 100, and operated in an opened state, a shield 700 which shields the vent 200, and tethers 720 and 760 which are connected with the shield 700, in which when an occupant in a vehicle collides with the airbag main body 100, the tethers 720 and 760 are operated such that the shield 700 shields the vent 200.

Hereinafter, the airbag apparatus 1 according to the exemplary embodiment of the present invention will be described.

First Exemplary Embodiment

Referring to FIGS. 1 to 4, an airbag apparatus 1a according to an exemplary embodiment of the present invention may include an airbag main body 100, a vent 200, a pocket 300, a releasing unit 500, a control unit 600, a shield 700, and a tether 720.

The airbag main body 100 is deployed by gas generated by an inflator (not illustrated) at the time of a vehicle collision, and serves to mitigate impact to an occupant P who collides with the airbag main body 100.

The vent 200 and the pocket 300 may be provided at one side of the airbag main body 100.

Figure 3A:
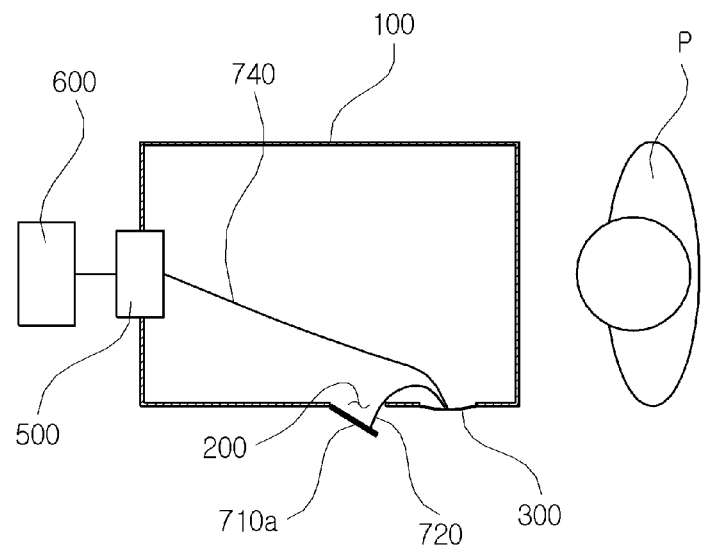
FIG. 3A is a view illustrating a state in which a vent is opened in accordance with a first exemplary embodiment of the present invention.

As illustrated in FIGS. 1 and 3A, because the vent 200 is formed in the opened state, the vent 200 leaks the gas even during the deployment of the airbag main body 100 so as to prevent deployment pressure of the airbag main body 100 from being excessively increased.

Because the opened vent 200 leaks the gas flowing into the airbag main body 100 even when the occupant P collides with the airbag main body 100, the opened vent 200 increases collision time when the occupant P collides with the airbag main body 100 so as to reduce impact force.

A first tether 740 is installed between the pocket 300 and the tether releasing unit 500.

That is, as illustrated in FIG. 3A, one side of the first tether 740 is connected to the tether releasing unit 500, and the other side of the first tether 740 is connected to the pocket 300. The first tether 740 restricts the pocket 300 so that the pocket 300 is not expanded even though the airbag main body 100 is deployed by the gas generated by the inflator (not illustrated).

Figure 3B:
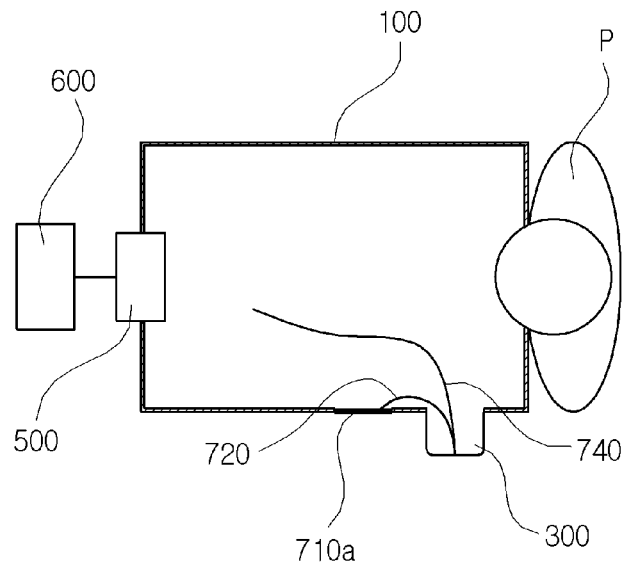
FIG. 3B is a view illustrating a state in which the vent is closed in accordance with the first exemplary embodiment of the present invention.

However, at a connection release time that is set in advance to a time when the tether releasing unit 500 releases the connection with the first tether 740, after the gas flows into the airbag main body 100, the tether releasing unit 500 releases the connection with the first tether 740 by a signal from the control unit 600, as illustrated in FIG. 3B.

Figure 2:
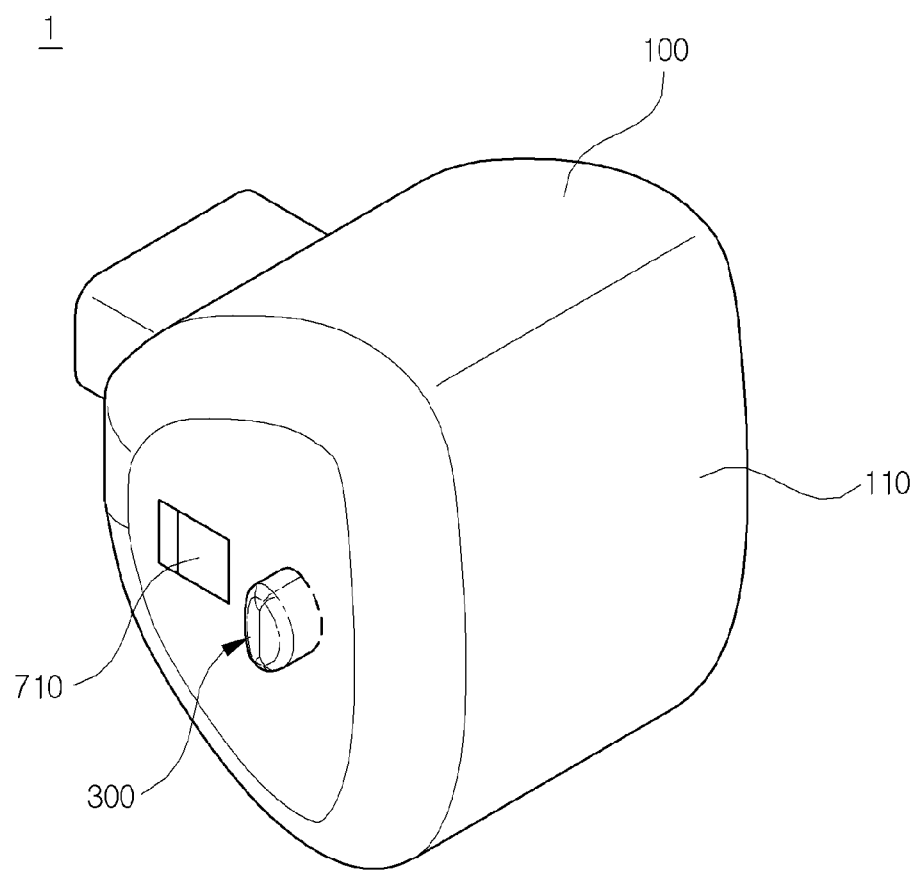

Accordingly, as illustrated in FIGS. 2 and 3B, the pocket 300 is expanded by the gas flowing into the airbag main body 100.

Here, the connection release time is within 50 ms to 70 ms after the occupant collides with the airbag main body 100.

Figure 4:
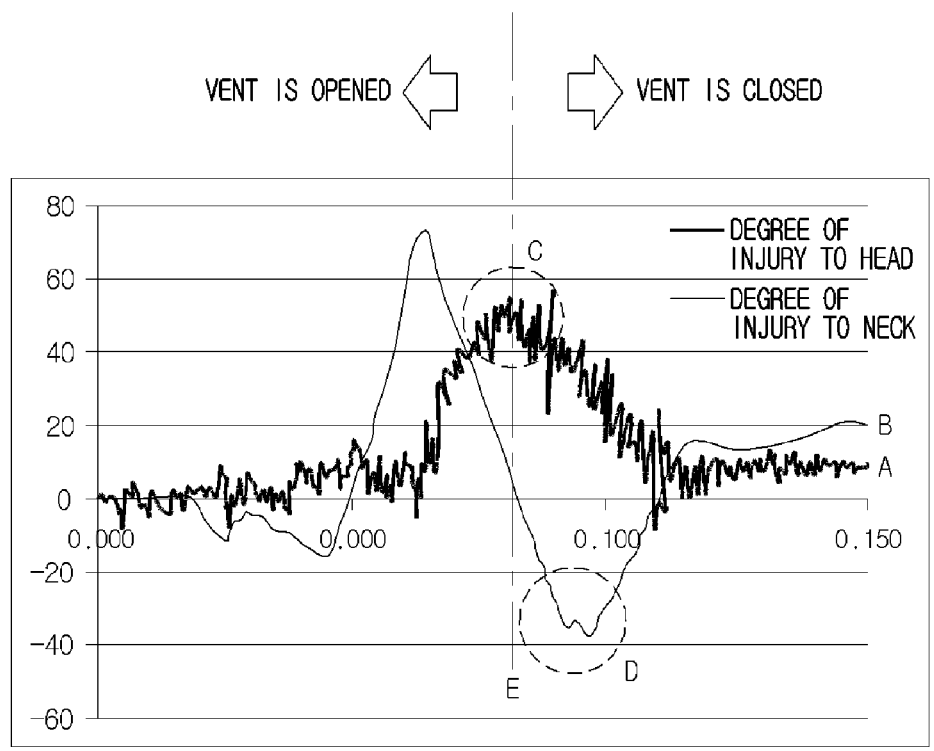
FIG. 4 is a view illustrating injuries to the head and neck.

Referring to FIG. 4, when the occupant P collides with the airbag main body 100, a degree of injury to the head is increased as indicated by a line A, and as the gas leaks through the vent 200, the degree of injury to the head is decreased as indicated by a region C. Therefore, the time within 50 ms to 70 ms corresponds to a point of time at which the degree of injury to the head is decreased. Here, the line A indicates the degree of injury to the head. A line E is a line along which internal pressure in the airbag main body 100 is maintained as the vent 200 is closed.

As indicated by a line B, after the degree of injury to the head is decreased, a degree of injury to the neck is increased after a region D, and the internal pressure in the airbag main body 100 is maintained by the shield 700 that will be described below, thereby improving an effect of preventing injury to the neck of the occupant P. Here, the line B indicates the degree of injury to the neck.

When the pocket 300 is expanded, the gas in the airbag main body 100 flows into the pocket 300. Therefore, the gas flows out through the vent 200 after the occupant P collides with the airbag main body 100, and the gas flows into the pocket 300 as the pocket 300 is expanded, and as a result, impact force transmitted to the occupant P is further reduced.

Here, the impact force may be varied depending on an expansion volume of the pocket 300.

The control unit 600 controls a point of time at which the tether releasing unit 500 releases the connection with the first tether 740.

The shield 700 shields the vent 200 while being operated in conjunction with the expansion of the pocket 300.

The shield 700 may include a cover 710a and the tether 720.

As illustrated in FIGS. 1 to 3B, the cover 710a is installed on an outer surface of the airbag main body 100 so as to cover the vent 200. For example, one side of the cover 710a is sewn on an outer portion of the airbag main body 100, and the other side of the cover 710a is connected to the tether 720.

The tether 720 is installed between the pocket 300 and the cover 710a. The tether 720 pulls one side of the cover 710a so as to close the vent 200 while being operated in conjunction with the expansion of the pocket 300. Here, a point of time at which the cover 710a closes the vent 200 may be adjusted based on a length of the tether 720.

Collectively, because the vent 200 of the airbag apparatus 1a is in the opened state when the airbag main body 100 is deployed, an amount of impact is reduced by the airbag main body 100 into which the gas flows even though the occupant P collides with the airbag main body 100.

Because the vent 200 is shielded by the shield 700, which is operated in conjunction with the expansion of the pocket 300, after the occupant P collides with the airbag main body 100, the flow of the gas flowing out through the vent 200 is shut off, such that internal pressure in the airbag main body 100 is maintained.

Accordingly, the airbag apparatus 1a may minimize influence that affects injury to the neck of the occupant.

Second Exemplary Embodiment

Figure 5A:
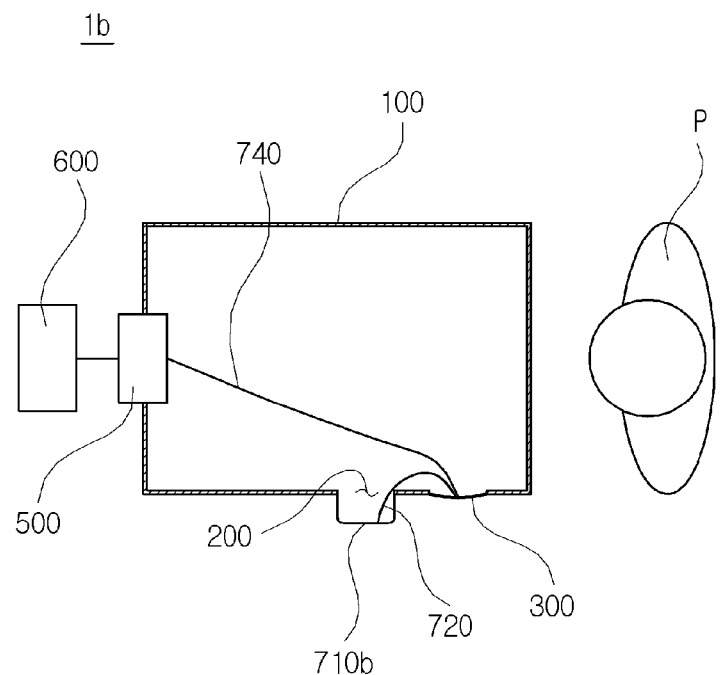
FIG. 5A is a view illustrating a state in which the vent is opened in accordance with a second exemplary embodiment of the present invention.
Figure 5B:
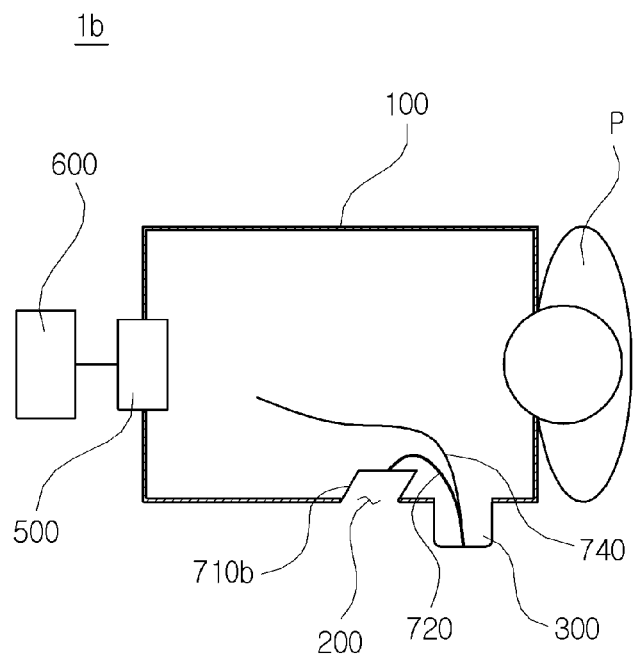
FIG. 5B is a view illustrating a state in which the vent is closed in accordance with the second exemplary embodiment of the present invention.

FIGS. 5A and 5B are views illustrating an airbag apparatus 1b according to another exemplary embodiment of the present invention.

Hereinafter, when the airbag apparatus 1b according to the second exemplary embodiment of the present invention is described, description of constituent elements identical to the constituent elements of the airbag apparatus 1a according to the first exemplary embodiment of the present invention will be omitted.

The airbag apparatus 1b may include an airbag main body 100, a vent 200, a pocket 300, a tether releasing unit 500, a control unit 600, a shield 700, and a tether 720.

The shield 700 shields the vent 200 while being operated in conjunction with the expansion of the pocket 300.

The shield 700 may include a tube 710b and the tether 720.

As illustrated in FIGS. 5A and 5B, the tube 710b is installed at one side of the airbag main body 100 so as to shield the vent 200.

The tube 710b has a pocket shape having an opening formed at one side thereof, and is installed outside the airbag main body 100 so that the opening of the tube 710b communicates with the vent 200. That is, an edge of the opening side of the tube 710b is installed at an edge of the vent 200.

Therefore, the gas flowing into the airbag main body 100 flows into the tube 710b through the vent 200, and as a result, the tube 710b is expanded.

That is, because the gas flows into the tube 710b through the vent 200, the vent 200 installed in the airbag apparatus 1b performs the same function as the vent 200 that is openably installed in the airbag apparatus 1a.

The tether 720 is installed between the pocket 300 and the tube 710b. The tether 720 pulls the tube 710b while being operated in conjunction with the expansion of the pocket 300, and allows the tube 710b to enter the inside of the airbag main body 100 through the vent 200, thereby closing the vent 200.

Here, a point of time at which the tube 710b closes the vent 200 may be adjusted based on a length of the tether 720.

Because the expanded tube 710b enters the inside of the airbag main body 100, the internal pressure in the airbag main body 100 is more quickly stabilized and maintained.

Third Exemplary Embodiment

Figure 6A:
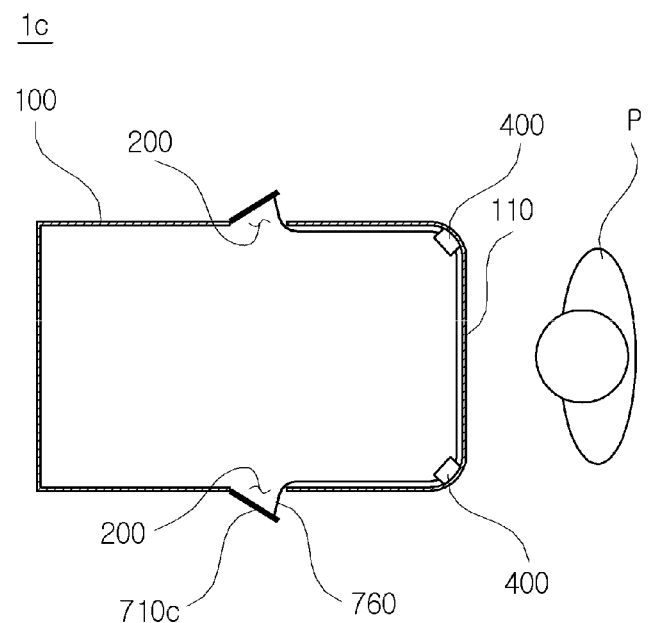
FIG. 6A is a view illustrating a state in which the vent is opened in accordance with a third exemplary embodiment of the present invention.
Figure 6B:
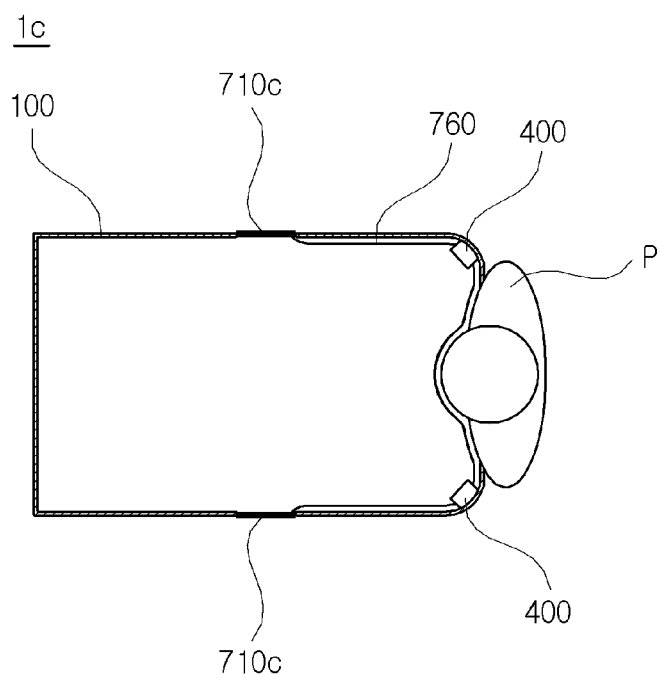
FIG. 6B is a view illustrating a state in which the vent is closed in accordance with the third exemplary embodiment of the present invention.

Referring to FIGS. 6A and 6B, an airbag apparatus 1c according to still another exemplary embodiment of the present invention may include an airbag main body 100, at least two vents 200, hinge portions 400, shields 700, and a tether 760. Here, the airbag main body 100 has a loading region 110 with which the occupant P collides, and the number of shields 700 corresponds to the number of vents 200 such that the shields 700 are installed to shield the vents 200, respectively.

The airbag main body 100 is deployed by gas generated by an inflator (not illustrated) at the time of a vehicle collision, and serves to mitigate impact to an occupant P who collides with the airbag main body 100.

At least two vents 200 may be provided at one side of the airbag main body 100.

As illustrated in FIG. 6A, because the vent 200 is formed in the opened state when the gas flows into the airbag main body 100, the vent 200 leaks the gas even during the deployment of the airbag main body 100 so as to prevent deployment pressure of the airbag main body 100 from being excessively increased.

Because the opened vent 200 leaks the gas flowing into the airbag main body 100 even when the occupant P collides with the airbag main body 100, the opened vent 200 increases collision time when the occupant P collides with the airbag main body 100 so as to reduce impact force that is applied to the occupant P.

The tether 760 is installed to be in close contact with the inside of the airbag main body 100 so as to connect the shields 700, respectively. When the occupant P collides with the airbag main body 100, end portions of the tether 760 are supported by the shields 700, respectively, such that an amount of impact applied to the occupant P is further reduced by the tether 760.

The hinge portions 400 allow the tether 760 to be in close contact with the inside of the airbag main body 100. Particularly, the hinge portions 400 may be installed to be in close contact with the inside of the airbag main body 100 that corresponds to the loading region 110.

That is, as the airbag main body 100 is deployed by the gas generated by the inflator (not illustrated), the hinge portions 400 restrict the tether 760 so that the tether 760 is in close contact with the inside of the airbag main body 100.

Therefore, when the occupant P collides with the loading region 110, the occupant P presses the loading region 110. The tether 760, which is installed to be in close contact with the loading region 110, is also pressed by the occupant P.

The shields 700 shield the vents 200 while being operated in conjunction with the pressing operation of the tether 760.

Here, the shields 700 may be covers 710c installed on an outer surface of the airbag main body 100.

The cover 710c is installed at one side of the airbag main body 100 so as to cover the vent 200. That is, as illustrated in FIGS. 1 and 2, one side of the cover 710c is sewn on the outer portion of the airbag main body 100, and the other side of the cover 710c is connected to the tether 760.

Therefore, the gas flowing into the airbag main body 100 is discharged through the vent 200 at the time of a vehicle collision. Because the vent 200 is in the opened state due to discharge force of the gas, the gas flows out through the vent 200 even though the occupant P collides with the airbag main body 100, such that an amount of impact applied to the occupant P is reduced.

As illustrated in FIG. 6B, the cover 710c closes the vent 200 while being operated in conjunction with the pressing operation of the tether 760. Therefore, the internal pressure in the airbag main body 100 is maintained.

Accordingly, the airbag apparatus 1c may minimize severity of the injury to the neck of the occupant P.

Meanwhile, the tether 760 pulls one side of the cover 710c so as to close the vent 200 while being operated in conjunction with the collision with the occupant P, and a point of time at which the cover 710c closes the vent 200 may be adjusted based on a length of the tether 760.

Collectively, because the vent 200 of the airbag apparatus 1c is in the opened state when the airbag main body 100 is deployed, an amount of impact is reduced by the airbag main body 100 into which the gas flows even though the occupant P collides with the airbag main body 100.

Because the vent 200 is shielded by the shield 700, which is operated in conjunction with the pressing operation of the tether 760, after the occupant P collides with the airbag main body 100, the flow of the gas flowing out through the vent 200 is shut off, such that internal pressure in the airbag main body 100 is maintained.

Accordingly, the airbag apparatus 1c may minimize the severity of the injury to the neck of the occupant.

Fourth Exemplary Embodiment

Figure 7A:
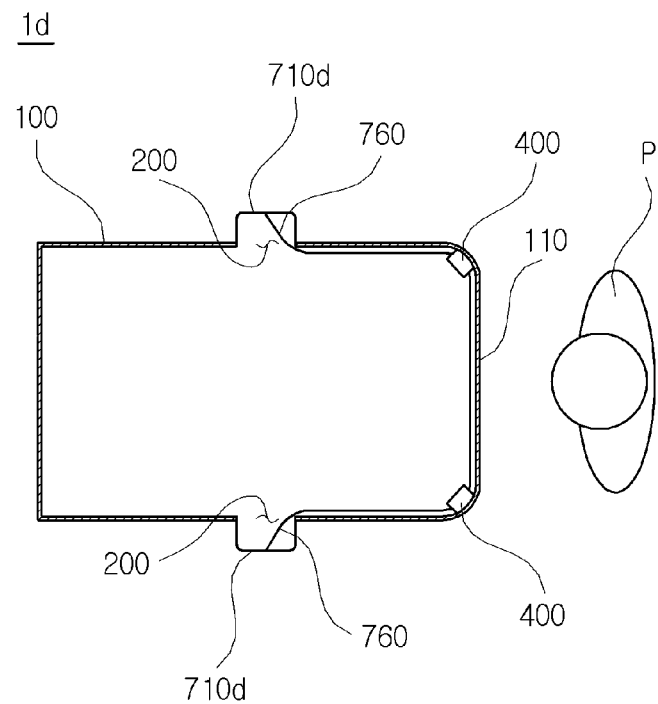
FIG. 7A is a view illustrating a state in which the vent is opened in accordance with a fourth exemplary embodiment of the present invention.
Figure 7B:
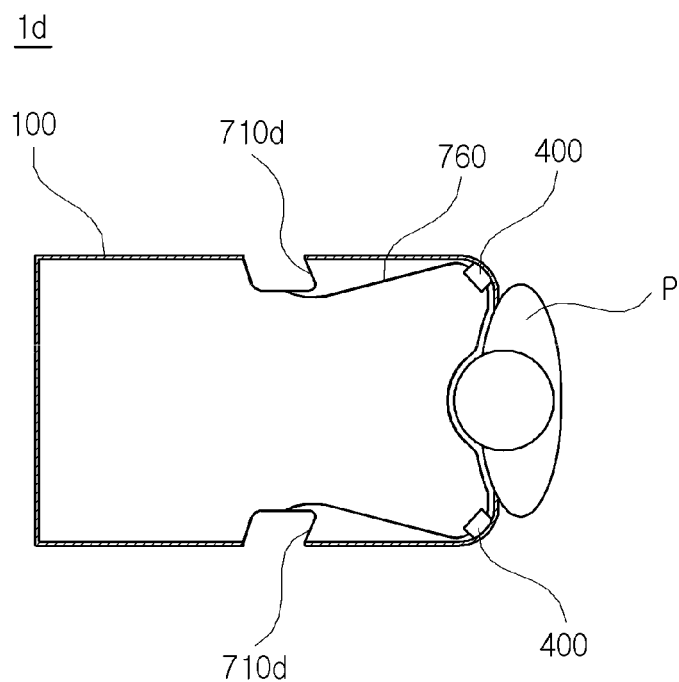
FIG. 7B is a view illustrating a state in which the vent is closed in accordance with the fourth exemplary embodiment of the present invention.

FIGS. 7A to 7B are views illustrating an airbag apparatus 1d according to yet another exemplary embodiment of the present invention.

Hereinafter, when the airbag apparatus 1d according to the fourth exemplary embodiment of the present invention is described, description of constituent elements identical to the constituent elements of the airbag apparatus 1a according to the first exemplary embodiment of the present invention will be omitted.

The airbag apparatus 1d may include an airbag main body 100, at least two vents 200, hinge portions 400, shields 700, and a tether 760.

The shields 700 shield the vents 200 while being operated in conjunction with a pressing operation of the tether 760. Here, the shields may be tubes 710d installed on an outer surface of the airbag main body 100.

As illustrated in FIGS. 7A and 7B, the tube 710d is installed at one side of the airbag main body 100 so as to shield the vent 200.

The tube 710d has a pocket shape having an opening formed at one side thereof, and is installed outside the airbag main body 100 so that the opening of the tube 710d communicates with the vent 200. For example, an edge of the opening side of the tube 710d may be installed at an edge of the vent 200.

Therefore, the gas flowing into the airbag main body 100 flows into the tube 710d through the vent 200, and as a result, the tube 710d is expanded.

That is, because the gas flows into the tube 710d through the vent 200, the vent 200 installed in the airbag apparatus 1d performs the same function as the vent 200 that is openably installed in the airbag apparatus 1.

Meanwhile, the tube 710d is pulled to the inside of the airbag main body 100 while being operated in conjunction with the pressing operation of the tether 760. Accordingly, the tube 710d enters the inside of the airbag main body 100 while passing through the vent 200 so as to close the vent 200. Here, a point of time at which the tube 710d closes the vent 200 may be adjusted based on a length of the tether 760.

Because the expanded tube 710d enters the inside of the airbag main body 100, the internal pressure in the airbag main body 100 is more quickly stabilized and maintained.

Fifth Exemplary Embodiment

Figure 8A:
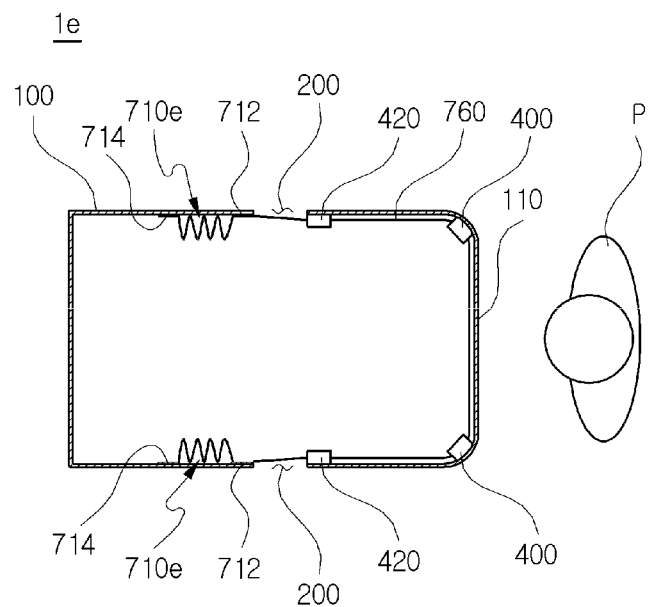
FIG. 8A is a view illustrating a state in which the vent is opened in accordance with a fifth exemplary embodiment of the present invention.
Figure 8B:
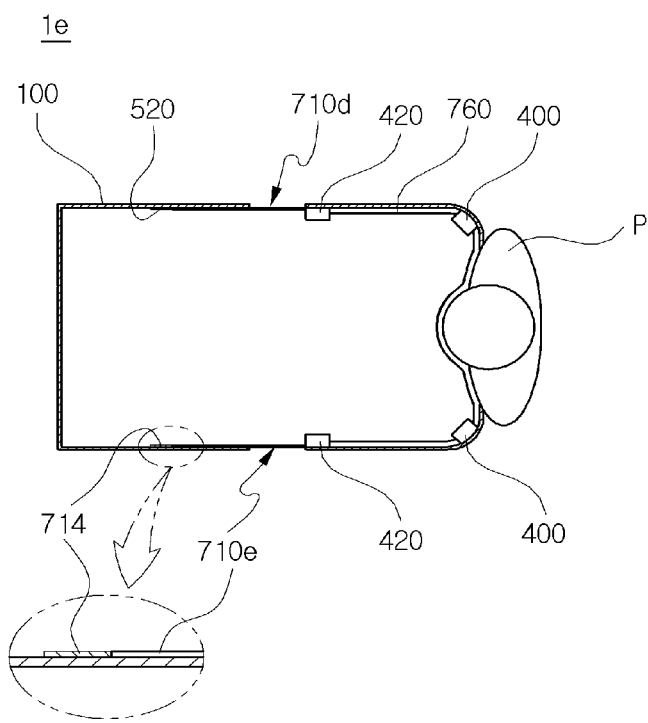
FIG. 8B is a view illustrating a state in which the vent is closed in accordance with the fifth exemplary embodiment of the present invention.

FIGS. 8A and 8B are views illustrating an airbag apparatus 1e according to still yet another exemplary embodiment of the present invention.

Hereinafter, when the airbag apparatus 1e according to the fifth exemplary embodiment of the present invention is described, description of constituent elements identical to the constituent elements of the airbag apparatus 1a according to the first exemplary embodiment of the present invention will be omitted.

The airbag apparatus 1e may include an airbag main body 100, at least two vents 200, hinge portions 400, shields 700, and a tether 760.

The shields shield the vents 200 while being operated in conjunction with a pressing operation of the tether 760.

Here, the shield may be a curtain 710e having one side and the other side that are sewn on an inner surface of the airbag main body 100 in a state in which the curtain 710e is folded. The curtain 710e may be formed in the form of a sheet.

In order to clearly describe the present invention, the sewn one side and other side of the curtain 710e may be a temporarily joined portion 712 and a support sewn portion 714, respectively.

The tether 760 is connected to the temporarily joined portion 712, and the temporarily joined portion 712 is fractured by pressing force applied to the tether 760. Accordingly, as illustrated in FIGS. 8A and 8B, one side of the curtain 710e, which is in the folded state, is moved in a length direction of the tether 760 so as to close the vent 200.

The support sewn portion 714 allows the curtain 710e to be fixed to the airbag main body 100 even though the temporarily joined portion 712 is fractured.

Here, a point of time at which the temporarily joined portion 712 of the curtain 710e is fractured may be adjusted based on a length of the tether 760.

Meanwhile, the airbag apparatus 1e may further include tether guide hinge portions 420.

The tether guide hinge portion 420 guides the tether 760 so that one side of the curtain 710e may close the vent 200 when the temporarily joined portion 712 is fractured.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An airbag apparatus comprising:
an airbag main body;
at least one vent which is provided at a side of the airbag main body, and operated in an opened state;
a shield which shields the vent;
a pocket which is provided at a side of the airbag main body;
a tether releasing unit;
a first tether which connects the pocket and the tether releasing unit; and
a second tether which is connected with the shield,
wherein when an occupant in a vehicle collides with the airbag main body, a variation in volume of the pocket occurs and the connection of the first tether is released so that the shield shields the vent.

2. The airbag apparatus of claim 1, wherein the shield further includes a cover which shields the vent, and the second tether connects the cover and the pocket.

3. The airbag apparatus of claim 2, wherein a point of time at which the cover shields the vent depends on a volume of the pocket and a length of the second tether.

4. The airbag apparatus of claim 1, wherein the shield includes a tube which is installed at an edge of the vent, wherein the second tether is installed between the tube and the pocket, and wherein the tube enters into the airbag main body while passing through the vent as the pocket is expanded.

5. The airbag apparatus of claim 4, wherein a point of time at which the tube enters the airbag main body depends on a volume of the pocket and a length of the second tether.

6. The airbag apparatus of claim 1, further comprising:
a control unit which controls a connection release time when the tether releasing unit releases the connection with the first tether after gas flows into the airbag main body.

7. The airbag apparatus of claim 6, wherein the connection release time is within 50 ms to 70 ms after a collision with the airbag main body.

8. The airbag apparatus of claim 1, further comprising:
a hinge portion which holds the tether in close contact with an inner surface of the airbag main body.

9. The airbag apparatus of claim 8, wherein the shield shields the vent while being operated in conjunction with the tether.

10. The airbag apparatus of claim 8, wherein the shield is a cover that has one side connected to the tether, and covers the vent when an occupant collides with a deployed airbag.

11. The airbag apparatus of claim 8, wherein the shield is a tube which is installed at an edge of the vent, and enters the inside of the airbag main body while passing through the vent when the tether pulls the tube.

12. The airbag apparatus of claim 8, wherein the shield is a curtain which is sewn to the airbag main body, and a first side of the curtain, which is connected with the tether, shields the vent when the tether pulls the one side of the curtain.

13. The airbag apparatus of claim 8, wherein a point of time at which the vent is shielded depends on a length of the tether.

14. The airbag of claim 1, wherein the first and second shields are covers which hinge outward from the airbag main body in the first orientation and cover the first and second vents in the second orientation.

15. The airbag of claim 1, wherein the first and second shields are curtains with first sides which are temporarily attached to the airbag main body in the first orientation, and detach from the airbag main body to extend over the vents in the second orientation.

16. An airbag apparatus comprising:
an airbag main body;
at least one vent which is provided at a side of the airbag main body, and operated in an opened state;
a shield which shields the vent, the shield being a curtain which has a first side and a second side, the first side being connected to the tether and the second side being sewn to the airbag main body; a tether which is connected with the shield; and
a hinge portion which holds the tether in close contact with an inner surface of the airbag main body;
wherein when an occupant in a vehicle collides with the airbag main body, the tether is operated so that the shield shields the vent, and
wherein the first side of the curtain includes a temporarily joined part that is attached to the airbag main body when it is joined, and disconnects from the airbag main body to shield the vent when a force is applied to the tether.

17. An airbag apparatus comprising:
an airbag main body;
first and second vents disposed in the airbag main body;
first and second shields adjacent to the first and second vents, respectively;
a tether coupled between the first shield and the second shield; and
a hinge portion which holds the tether in close contact with an inner surface of the airbag main body,
wherein the shields are in a first orientation with respect to the vents when the airbag inflates, and the shields are in a second orientation with respect to the vents when a vehicle occupant collides with the inflated airbag.

18. The airbag apparatus of claim 17, wherein, in the first orientation, the shields do not cover the vents, and in the second orientation, the shields cover the vents.

19. The airbag of claim 17, wherein the first and second shields are tubes which protrude from the airbag main body in the first orientation, and extend into the airbag main body in the second orientation.

* * * * *